Figure 1:
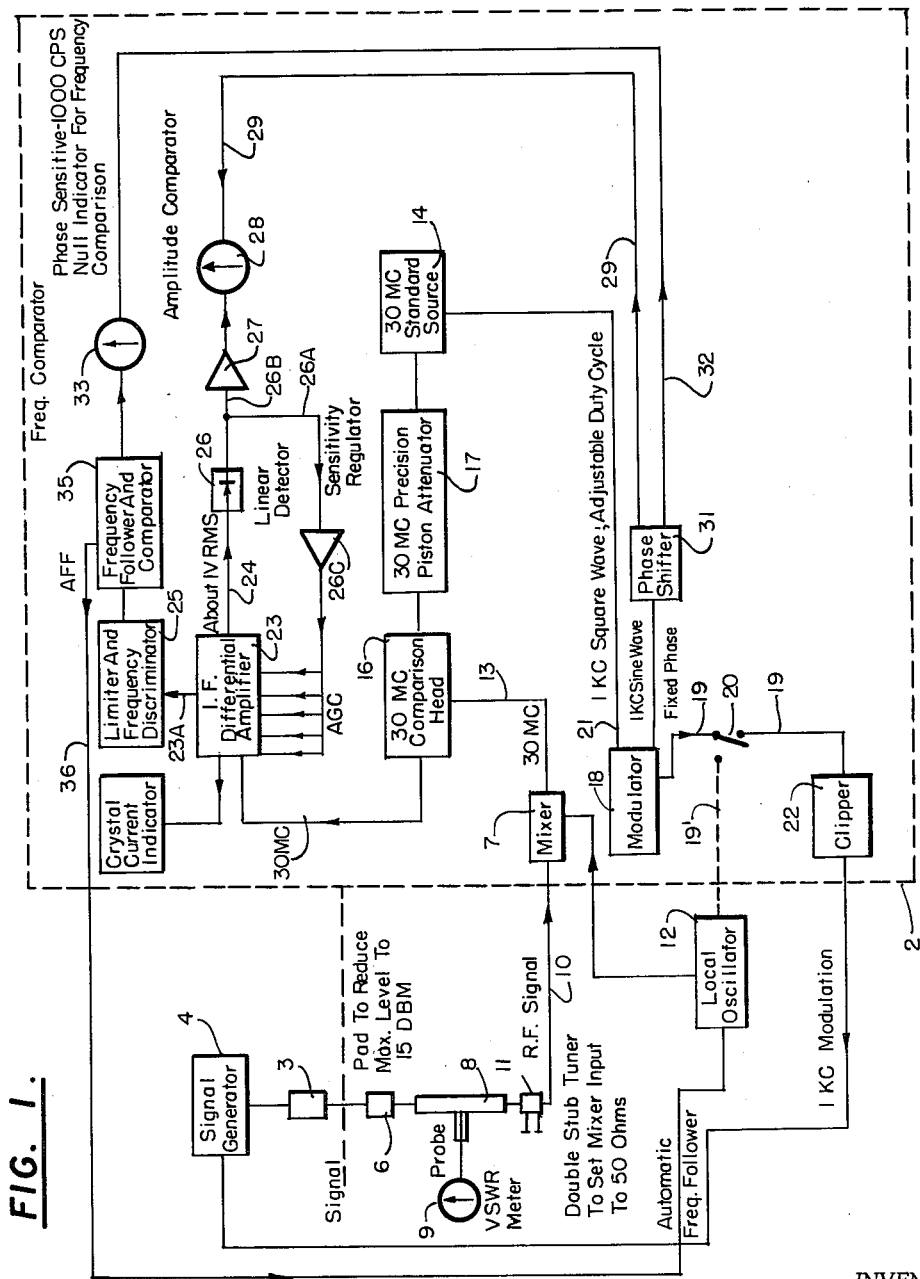

RE 25396

May 8, 1962   B. O. WEINSCHEL   3,034,045
VOLTAGE RATIO METER FOR HIGH-FREQUENCY CALIBRATION SYSTEMS
Filed Oct. 25, 1960   3 Sheets-Sheet 1

INVENTOR
Bruno O. Weinschel

BY   Max L. Libman

ATTORNEY

May 8, 1962 B. O. WEINSCHEL 3,034,045
VOLTAGE RATIO METER FOR HIGH-FREQUENCY CALIBRATION SYSTEMS
Filed Oct. 25, 1960 3 Sheets-Sheet 2

INVENTOR
Bruno O. Weinschel

BY Max L. Libman

ATTORNEY

May 8, 1962   B. O. WEINSCHEL   3,034,045
VOLTAGE RATIO METER FOR HIGH-FREQUENCY CALIBRATION SYSTEMS
Filed Oct. 25, 1960   3 Sheets-Sheet 3

INVENTOR
Bruno O. Weinschel
BY   Max L. Libman
ATTORNEY

United States Patent Office 3,034,045
Patented May 8, 1962

3,034,045
VOLTAGE RATIO METER FOR HIGH-FREQUENCY CALIBRATION SYSTEMS
Bruno O. Weinschel, Bethesda, Md., assignor to Weinschel Engineering Co., Inc., Kensington, Md., a corporation of Delaware
Filed Oct. 25, 1960, Ser. No. 64,766
8 Claims. (Cl. 324—58)

This invention relates to high-frequency calibration systems and apparatus, and particularly to a high-frequency voltage ratio meter system for use in calibrating laboratory equipment over a dynamic range in excess of 90 db in one step, and in a wide frequency range, typically from 100 to 4,000 megacycles and higher.

A related equipment is described in IRE Transactions on Instrumentation, by A. L. Hedrich et al., December 1958 (vols. 1–7, Nos. 3 and 4), entitled "Calibration of Signal Generator Output Voltage in the Range of 100 to 1000 Megacycles"; and by B. O. Weinschel et al., March 1959 (vols. 1–8, No. 1), entitled "Relative Voltmeter for VHF-UHF Signal Generator Attenuator Calibrator."

The present invention relates to a similar equipment to that described in the above publications, but is directed to improvements which greatly extend the useful range and accuracy of the equipment. The prior equipment was limited to an effective upper range in the order of 1000 megacycles, while the present equipment, by virtue of the improvements described, can be used for extremely high precision measurements up to 4000 megacycles and higher.

This extension of the useful range of the apparatus results primarily from the elimination of certain sources of error and inaccuracy, as will be described in more detail below, and also from certain additions and improvements which cause automatic compensation of a major source of error, namely, frequency instability of the associated laboratory equipment used in making the test.

It is therefore a major object of the invention to provide an improved equipment of the type described in the IRE publications cited, and more particularly to render such equipment practically insensitive to frequency instability of the associated laboratory equipment, e.g., signal generator, local oscillators, etc.

Another object is to increase the utility and versatility of the apparatus by permitting the use of any signal generator, even one which has only fair frequency stability, which was not previously possible.

Figure 2:
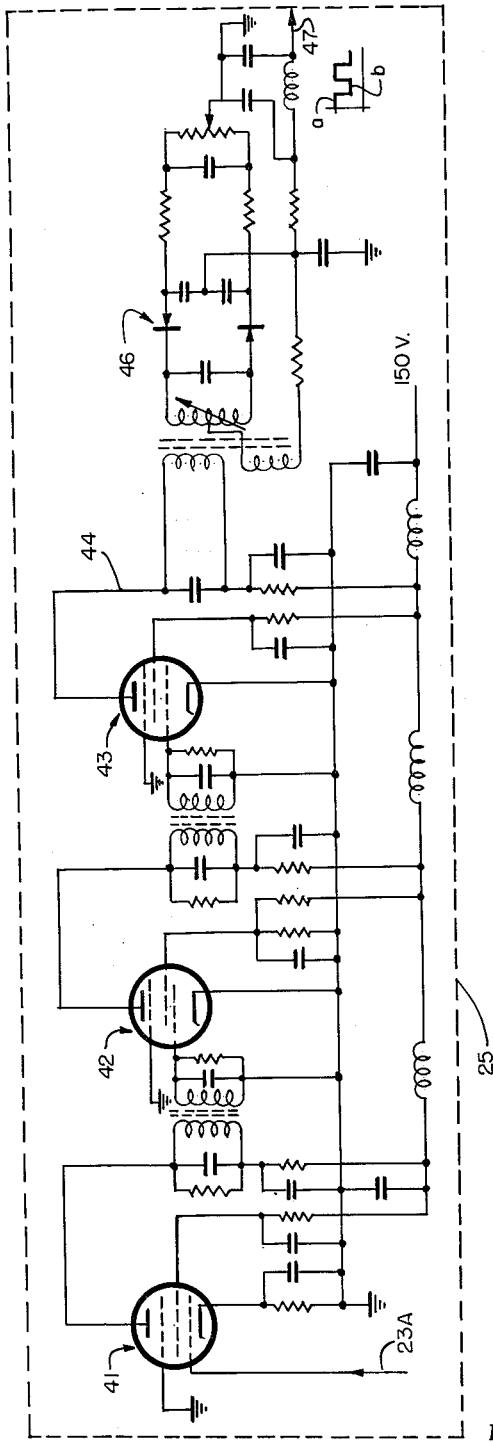
Figure 4:
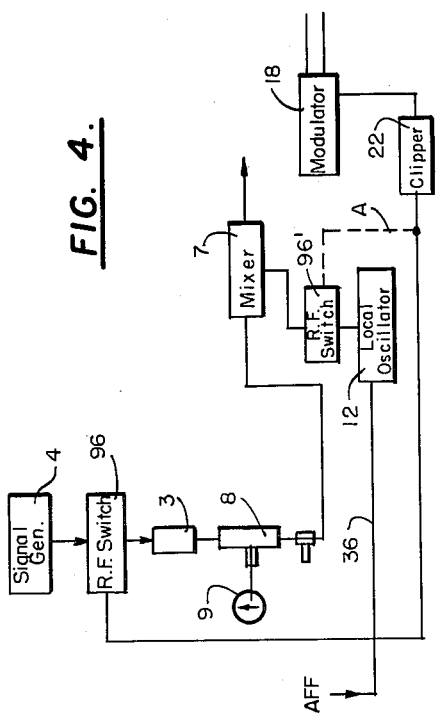
Figure 3:
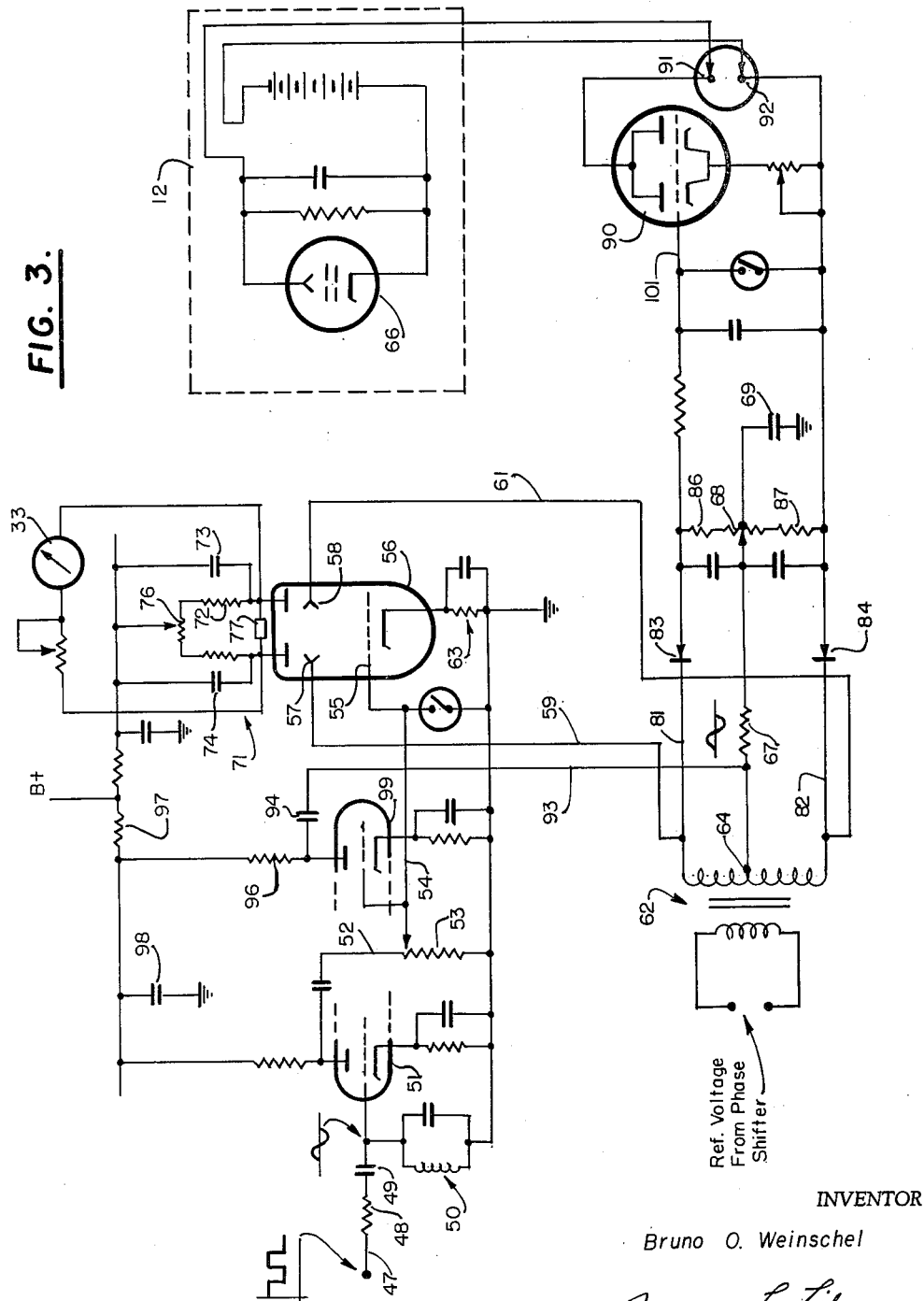

The specific nature of the invention, as well as other objects and advantages thereof, will clearly appear from a description of a preferred embodiment as shown in the accompanying drawings, in which:

FIG. 1 is a block circuit diagram of the invention;
FIG. 2 is a schematic circuit diagram of the limiter and frequency discriminator circuit;
FIG. 3 is a schematic circuit diagram of the automatic frequency follower circuit; and
FIG. 4 is a block circuit diagram showing one form of switching.

Referring to FIG. 1, the apparatus which is usually furnished as a unitary special equipment for calibration purposes is shown within the dotted line 2. The apparatus outside of the dotted line is usually available in any properly equipped laboratory and includes the equipment under test, which may be, typically, an attenuator 3, supplied by any signal generator 4, of the attenuator may be the output attenuator of the specific signal generator under test. A conventional pad 6 is used (if needed) to reduce the maximum signal level to a suitable value, e.g., to −15 dbm (db with reference to 1 milliwatt), and the signal is fed by line 10 to the mixer 7 through a conventional slotted line section 8 and VSWR indicator 9, and impedance matching unit 11, which may be a double-stub tuner, which matches the mixer to the proper impedance. The output of a local oscillator 12, operated at a frequency which is separated from the frequency of the R-F signal on line 10 by 30 megacycles, is also fed to mixer 7, so that the output of the mixer on line 13 is at 30 megacycles. The mixer 7 has a linear characteristic, that is, the amplitude of the output voltage at the intermediate frequency (30 megacycles) is linearly related to the amplitude of the input signal. The mixer output is then compared with the 30 megacycle output of a crystal controlled highly stable standard source 14, which is fed to 30 megacycle comparison head 16 through a precision piston attenuator 17 in order to supply a very accurately controlled output to the comparison head 16. The amount of change in attenuation of the adjustable piston attenuator required to maintain equality (or at least a constant fixed ratio) of the inputs to the comparison head 16 is measured as indicative of the change in signal generator output.

While the piston attenuator is a high precision device, it has the known disadvantage of a "zero loss" of about 30 db. This attenuator is therefore not put into the signal channel in the circuit of FIG. 1, but a parallel type I.F. substitution is employed. The two amplitudes of the I.F. signal and the standard signal are compared, and the piston attenuator is adjusted until they are exactly equal. To accomplish this comparison in a convenient manner, signal generator 4 and the standard 30 megacycle source 14 are squarewave modulated at a 1000 cycle per second rate, by means of a 1000 cps. square modulator 18. This modulator produces a 1 kc. squarewave with adjustable phase and duty cycle so arranged that the two outputs on lines 19 and 21 are interlaced, i.e., when there is a pulse on one line there is none on the other line, and vice versa. The output on line 19 is preferably applied through a clipper 22 to the signal generator 4; however, not all available signal generators are capable of being so modulated, in which case local oscillator 12 is alternatively modulated as shown by line 19 and switch 20. As previously indicated, the standard source 14 and signal generator 4 (or local oscillator 12) are modulated in counter phase, i.e., when one is off, the other is on, and vice versa; therefore, the signal coming out of the comparison head 16 is a 30 mc. signal due to either the signal from the standard source 14 through the piston attenuator 17, or the signal from generator 5 through the mixer 7. If these two signals are now of proper relative amplitude, the resulting signal going into the I.F. differential amplifier 23 is a steady 30 mc. signal with no 1000 cycle modulation apparent; however, if the two signals are not of the proper relative amplitude, then there will be a 30 mc. output which is amplitude modulated at 1000 cycles, on line 24; this is demodulated by linear detector 26, amplified at 27 by a tuned 1000 cycle amplifier, and applied to a phase sensitive 1000 cycle null indicator 28 which is also supplied on line 29 with a 1 kc. comparison input from modulator 18 through phase shifter 31, for amplitude comparison. Another output from phase shifter 31 on line 32 is applied to phase indicator 33 for frequency comparison.

It should be mentioned that the local oscillator 12 is shown as a separate unit in order to increase the range and flexibility of the equipment, since this enables any one of a number of such oscillators of different frequency ranges to be used, and the frequency range of the local oscillator must be selected to suit the signal frequency. The system so far described is essentially similar to that described in the two IRE reference previously cited.

There are two ways in which a 1000 cycle modulation might appear on the output of the I.F. differential amplifier 23. One way, as previously described, is due to the signals going into the comparison head not being of the proper relative amplitudes. It is not essential that the signals should actually be equal in amplitude, because in the comparison head, one of these signals is attenuated slightly more than the other; however, a certain ratio must be maintained to produce a null output. This is due to the fact that the impedances of the mixer 7 and the piston attenuator 17 are different, but since their ratio remains constant, this difference is readily compensated for.

Another (an error-producing) source of 1000 cycle amplitude modulation at the output of the differential amplifier can occur if the two signals which are being compared differ slightly in frequency, because if this occurs, there will be a slight difference in frequency of the two signals applied to the differential amplifier, and if there is any appreciable slope in the I.F. amplifier characteristic, then even though there might not be any 1000 cycle modulation on the 30 mc. signal going into the amplifier, there might very well be a 1000 cycle amplitude modulation when it comes out. This would, of course, give an erroneous indication. Therefore, the differential amplifier characteristic should be kept as flat as possible so that if there is a slight difference in the frequencies, the resulting amplitude modulation will be minimized. It is necessary to keep the output of the mixer as nearly as possible at the same frequency as the output of the 30 mc. standard source. Note that this is more important than maintaining the standard source exactly at its rated frequency. As long as the two signals are of the same frequency, this second type of error will not occur. At the lower frequencies, it is relatively easy to adjust the local oscillator to the proper frequency, and to maintain the drift sufficiently small to be acceptable. However, as the frequency rises, the absolute drift that is tolerable does not change, but the percentage drift becomes much more important, and the percentage drift which is tolerable becomes much less because of the higher frequency. For example, at 400 or 500 megacycles, it is relatively easy to maintain a frequency stability of about 5 or 10 kc., but at 4000 mc., this is a practical impossibility, because of the many factors which tend to change the frequency. The overall stability is not only a function of the stability of the local oscillator, but is also a function of the stability of the signal generator, because either of these drifting can produce a change in the output frequency at the mixer. Furthermore, the stability of the signal generator is one of the things being tested.

In order to minimize the second error, we employ what we term an "automatic frequency follower and comparator." This is essentially a feedback signal applied on line 36 to the local oscillator 12, this signal being of such magnitude and direction as to control the local oscillator frequency and keep the difference frequency on line 13 the same as the frequency of the standard source 14.

It should be noted that meter 33 shows the difference in frequency between the 30 mc. standard signal from source 14, and the output signal of the mixer. It is necessary for these frequencies to be alike so that the gain of the I.F. amplifier 23 is identical for both of these signals. The I.F. amplifier is, of course, made to have as flat a frequency characteristic as possible (a 100 kc. portion of the passband is flat within 0.1 db peak-to-peak). At high frequencies, it becomes difficult to keep the frequency difference less than 5 kc. This difficulty, however, is overcome by the "AFF" circuit shown. This circuit will serve the local oscillator over a drift range of .5% and thus maintain the frequency difference between the mixer output and the standard signal less than 5 kc. The circuit employed (FIG. 2) has enough discrimination to operate at levels as low as −107 dbm.

In order to extend the range of an I.F. substitution test set at the lower-level end, it is important to reduce the noise, which is done hereby using a low crystal current and small I.F. amplifier bandwidth. However, reduction of crystal current also reduces the linear range of the mixer at the high-level end (−15 dbm) and affects the R-F and I.F. impedance of the mixer, requiring a design compromise between these factors. Similarly, a narrow bandwidth in the I.F. amplifier requires corresponding frequency stability of the R-F signal and the local oscillator which entails another compromise. In a practical equipment according to the invention, the noise bandwidth of the I.F. amplifier is approximately 1 mc. p. s.; however, this noise is further reduced by employing a 1000 cycle per second synchronous detector and filter following the linear detector 26, to the point where at R-F input levels −107 dbm to the mixer (which is 15 db below the equivalent input noise), the fluctuation of the output indicator is less than ±0.2 db, using a 0.1 second time constant in the output indicator.

If the signal generator 4 is not designed for frequency control by external voltage, local oscillators 12 are commercially available which are readily controllable as to frequency, within a useful range, by applying a D.-C. voltage of proper magnitude and direction to a control element, e.g., the repeller of the klystron employed in the oscillator. Such a signal is produced by the frequency follower 35. One practical circuit for this is shown in detail in FIG. 2, but it will be understood that other frequency-responsive circuits could be designed to produce a D.-C. output which is a function of the magnitude and direction of the frequency difference between the two frequency inputs from the mixer and the standard source respectively. For the purpose of the present equipment, the standard source may be taken to be constant.

In FIG. 1, everything following the comparison head 16 serves to indicate a null in the 1000 cycle modulation on its 30 mc. output. To prevent the sensitivity of the null indication from falling off at low input levels, the I.F. amplifier 23 is provided with automatic gain control that maintains a level of approximately 1 volt at the detector for inputs of from 5 microvolts to 50 millivolts. This requires a gain change of 80 db.

The I.F. amplifier response is centered at 30 mc. with a bandwidth of approximately 1 mc. between 3 db points. The maximum slope of the response is less than 0.01 db per 10 kc. over a 100 kc. band at the center of the characteristic.

Two outputs are taken from the I.F. amplifier 23. One is to the linear detector 26 that furnishes the AGC voltage on line 26A and the voltage on line 26B, through a suitable amplifier 27, to the amplitude comparator 28. The other output goes to frequency discriminator 25, the output of which is applied to frequency follower and comparator 35, thence as one input to phase sensitive meter 33, for comparison with the phase of the sine wave on line 32 as previously described. This latter indicator is provided to insure that no 1000 cycle modulation is generated as a result of a difference in frequency of the two input signals. In practice, the local oscillator frequency is adusted to produce a null frequency difference indication. The limiters allow this adjustment to be made prior to the amplitude balance. The characteristic of discriminator 25 is such that a 5-kc. difference will produce full scale deflection on a zero center meter independent of input level from 40 mv. to 10 microvolts; a 2-kc. difference will produce a deflection of 5 divisions for the same range of input voltages. These are at the maximum sensitivity settings, which can be reduced if desired. The limiting action is such that the frequency adjustment can be made even if the two signals differ in amplitude by as much as 40 db. Any known type of frequency discriminator, for example, a ratio detector, may be employed, but a preferred circuit is shown in FIG. 2.

The I.F. differential amplifier 23 should be carefully regulated and for this purpose an output is taken on line 24 through linear detector 26 which furnishes the AGC voltage on line 26A and the voltage for the amplitude null detector on line 26B. The AGC voltage on line 26A is passed through sensitivity regulator 26C, which is in practice a controllable D.C. amplifier, and in a practical embodiment used to regulate five stages of the I.F. differential amplifier, as schematically indicated in FIG. 1. Any suitable known system of gain control may be employed, and the details of the particular I.F. differential amplifier employed are not per se a part of the present invention.

FIG. 4 shows a modification of a portion of FIG. 1, namely the means for alternately switching the signals from the signal generator (or local oscillator) for interlacing with the signals from the standard source.

In FIG. 1, there is means for switching alternately the two signals which are being compared so that they are fed alternately into the differential amplifier. If either the signal generator or the local oscillator is switched on and off, as was accomplished by the form of 1 kc. modulation shown in FIG. 1, a "slow" drift of frequency (that is, relative to ½ millisecond) is apt to occur until the output becomes stable. As this is an appreciable portion of the pulse time, it may introduce some undesirable distortion into the squarewave pulse which is emitted, thus interfering with the accuracy.

In general, it is preferable to modulate the signal generator rather than the local oscillator (although means are shown for doing either) since noise output from the mixer crystal is a function of the crystal current, keeping in mind that the local oscillator signal is much greater than the signal generator signal. With the local oscillator modulated, the noise output of the mixer crystal will vary between the "on" and "off" period, since the noise output of a crystal varies with the crystal current. For wide-range signals, the signal generator should therefore be modulated if possible to eliminate noise modulation at the output of the mixer.

Instead of turning on and off the local oscillator, the modification of FIG. 4 utilizes an R-F switch 96 or 96' which may be placed either in the output of the local oscillator or (preferably) in the output of the signal generator, and which may be operated by the modulator output in the same way as before, except that instead of turning the oscillator or signal generator on and off each time, it merely, in effect, interrupts the output, which remains constant since the generator or oscillator continues operating during the entire interval. The R-F switch may be a crystal type semi-conductor operated as a diode switch, or may be a ferrite switch, suitable devices being commercially available.

FIG. 2 shows a schematic circuit diagram of a practical limiter and frequency discriminator circuit such as is represented by block 25 in FIG. 1. The input on line 23A from the differential amplifier is first passed through a buffer stage 41 and then through two limiter stages 42 and 43, which are essentially of conventional design, in order that the output of the frequency discriminator shall be a function of only the frequency difference of the inputs and as completely as possible be independent of their amplitudes. The output of limiter stage 43, now of highly controlled amplitude on line 44, is now supplied to the frequency discriminator circuit 46, which is essentially a ratio detector type of discriminator, as will be apparent from the circuit shown. The output of the frequency discriminator 46 will now appear on line 47 as a 1000 cycle square wave in which the levels *a* and *b* respectively correspond to the two sources which are being compared, due to the interlaced 1000 cycle modulation previously described. Since we are not interested in the absolute frequencies of the two sources, but only in their relative frequencies, that is, the difference between the top and bottom of the squarewave, the signal is passed on line 47 (FIG. 3) through a decoupling resistor 48 and 0.1 microfarad condenser 49 to the grid of tube 51. Due to the resonant circuit 50, which is tuned to 1000 cycles, we now obtain a sine wave input to the grid of the amplifier tube 51, and the amplitude of the sine wave is proportional to the frequency difference between the output of the megacycle standard source 14 and the output of mixer 7. If there is no frequency difference between the two, the amplitude of this sine wave will be zero. By using a synchronous detector based on the standard source 14, as will be shown below, we can now obtain a measure of the amplitude and phase with respect to the standard source in order to obtain a control voltage which may be used to equalize the difference between the I.F. and the standard signal.

The output of tube 51 is passed on line 52 through adjustment potentiometer 53 and line 54 to the control grid of tube 56. This tube (type V–602) is used as a synchronous detector tube and is provided with two deflector grids 57, 58 which are supplied, on lines 59 and 61 respectively, with the sine wave signal from transformer 62, the primary of which is supplied with the reference voltage from phase shifter 31 (FIG. 1). The cathode of tube 56 is provided with the usual bypass capacitor and grid resistor, as indicated at 63, for establishing the necessary bias voltage. It will be noted that the signal on the two grids 57, 58 is opposite in phase since they are attached to opposite ends of the transformer secondary. It should be noted that the secondary center tap 64 is not actually grounded due to necessity for including the control voltage in the rather high repeller voltage of klystron 66, which is being controlled by the circuit, as will be explained below, and which may be a different voltage for different circuits with which it is used. However, this center tap is passed through a 470K resistor 67 to the level adjusting potentiometer 68 through a large capacity condenser (e.g., 2 microfarads) 69 to ground.

The comparator circuit itself is generally indicated at 71, and includes the two anodes of tube 56, which function as deflection plates under control of the deflection grids 57 and 58. These plate circuits include the respective plate resistors 71 and 72, bypass condensers 73 and 74, and an adjusting potentiometer 76, through which this circuit is returned to the plate supply voltage. Meter 33 (see also FIG. 1) is connected to the respective anodes of tube 56. The bypass capacitors 73 and 74 are included to eliminate any ripple and to insure smooth D.-C. potential across the resistors. The two deflector grids 57 and 58 deflect the electron stream very strongly; if one of them is positive it will attract the electron beam and the other will conversely repel it with the arrangement shown. The grid signal input on line 54 from the preceding stage determines the intensity of the electron current, and if grid 55 is positive at the moment when deflection grid 57 is also at a maximum positive, then the beam will be strongly deflected toward the other plate. The potential at this plate will therefore go strongly down while the other plate correspondingly is at a higher potential, and this will be indicated by meter 33 which thus gives a visual indication of the relative frequencies. Potentiometer 76 will in practice be mounted on the control panel for initial adjustment to balance the two plates, and in a practical embodiment, a Thyrite element 77 is inserted between the two plates to prevent damage to meter 33 due to overload, as is understood in the art.

The above circuit provides a visual indication, but it is also necessary to provide a control voltage signal back to the local oscillator 12 (FIG. 1) in order to keep the frequency on line 13 the same as the output of standard source 14. In addition to being supplied to leads 59 and 61 for the above purpose, the output of transformer 62 is also supplied on leads 81 and 82 to two diodes 83 and 84, through two resistors 86 and 87 to the potentiometer 68. It will be noted that this is in some respects a similar circuit to the comparator circuit above described, but a separate circuit is required because of the necessity of including the high klystron voltage in this circuit, as previously mentioned. The local oscillator 12 of FIG. 1 includes a klystron tube 66, the control voltage of which determines the frequency of its output. This is typically a fairly high voltage, and the necessary control for the present purpose is secured by adding to or subtracting from this voltage. For this purpose, the repeller voltage circuit of tube 66 is put in series with tube 90, the grid of which is controlled by the circuit previously descrbed. Since the potential coming in on points 91 and 92 is determined by the external circuit, the arrangement must be such as to accommodate a variety of such circuits. The actual potential to ground from the center of transformer 62 depends upon the circuitry of the oscillator which is employed. Since this must be fed in directly at points 91, 92, a transformer cannot be used at this point on account of the voltage isolation which it would introduce between the two circuits. The center point of potentiometer 68 is essentially grounded through large capacitor 69, so far as A.-C. is concerned. Similarly, the center point for the comparator circuit 71 is essentially grounded through lead 93, capacitor 94, plate resistor 96, and through the large capacitor 98 (e.g., 2 mfd.) to ground. A signal across the plate resistor 96 of amplifier tube 99 is the same as the signal across resistor 67, and the output will now be proportional to the product of the two signals being compared. This output is applied on line 101 to the grid of tube 90 and will be zero for the condition of equality of the two frequencies. The D.-C. voltage on line 101 will also be positive when the output of the I.F. differential amplifier 23 is larger than 30 megacycles, and negative when this output is less than 30 megacycles. This is, of course, assuming that the standard source actually maintains 30 megacycles exactly. More strictly, the circuit merely adjusts the local oscillator until it matches the frequency of the standard source, and this is all that matters for the test under consideration, since a small deviation in frequency of the standard source would do no harm. In the klystron circuit shown, the vacuum tube 90 now acts in effect as a series regulator for the circuit of klystron tube 66. It will be apparent that the repeller voltage will become smaller for negative voltages and larger for positive voltages, which produces the desired regulation of frequency. Tube 90 may be regarded as a variable impedance which varies with the applied voltage between the grid and cathode, that is, with the control voltage.

Without the above-described automatic frequency follower circuit, the frequency stability of a good R-F source is sufficient to permit manual adjustment of the local oscillator so as to keep the frequency difference less than 5 kc. However, at higher frequencies, this becomes very difficult to do, and in practice, cannot be done satisfactorily. On the other hand, above 900 mc., the circuit above described will servo the local oscillator over a drift range of ±0.5 percent in order to maintain the frequency difference between the mixer output and the standard signal less than 5 kc. This circuit has sufficient discrimination to operate at levels as low as −107 dbm. In practice, this has extended the upper range of the instrument from 1000 megacycles to 4000 megacycles.

It should be noted that the time required for making a measurement of the type described is in the order of ½ minute to a minute, and in that time many available signal generators would drift sufficiently in frequency so that the measurement simply could not be made in the time available. This was one of the factors which has heretofore set the upper limit of 1000 megacycles in apparatus of this type. In practice, very tight control of both the signal generator frequency and the local oscillator frequency would minimize this difficulty, but this would restrict the use of the equipment to very narrow bands of frequencies, rather than allowing general coverage over the entire range which is possible with the present instrument, from 100 megacycles to 4000 megacycles. The present invention therefore allows the use of any signal generator which has only fair frequency stability over this very large range.

It will be apparent that the embodiments shown are only exemplary and that various modifications can be made in construction and arrangement within the scope of the invention as defined in the appended claims.

What is claimed is:

1. An insertion loss test system comprising a high-frequency signal generator supplying an output at a frequency from 1,000 to 4,000 megacycles for supplying a high-frequency device whose insertion loss is to be tested; a standard source of intermediate frequency at a certain amplitude, said source being subject to spontaneous changes in frequency during a test; a local oscillator; a mixer for beating the output of said generator in the range up to 4,000 megacycles through said high-frequency device with the output of said local oscillator to provide a heterodyne frequency output equal to said intermediate frequency; an intermediate-frequency amplifier; means including an audio-frequency squarewave modulating device for supplying the output of said mixer and of said standard source in counterphase to said intermediate frequency amplifier at said A-F so that each of said outputs is alternately supplied in interlaced fashion; amplitude limiter means for limiting the output of the I.F. amplifier to a constant level; means supplied by said I.F. amplifier for converting said interlaced outputs to interlaced D.-C. outputs whose respective D.-C. levels are representative of the respective frequencies of said mixer output and of said standard source output; means for converting said interlaced D.-C. outputs to a sine-wave output at said audio frequency whose amplitude is indicative of the difference of said respective frequencies; means for converting said sine-wave output to an uninterrupted D.-C. voltage indicative of the difference in sense and magnitude between said two respective frequencies; voltage-controlled frequency control means for varying the frequency of said local oscillator output; and means for applying said D.-C. voltage to said last means to equalize the frequency of said mixer output to the same frequency as the standard source regardless of said spontaneous changes, and means for comparing said certain amplitude of the standard source output with the output amplitude of the intermediate frequency amplifier as a measure of attenuation of the system being tested.

2. The invention according to claim 1, said interlace means comprising R-F output switching means controlled by said modulating device for controlling the input to said mixer.

3. The invention according to claim 1, said voltage-controlled frequency control means including klystron tube means, the control voltage of which determines the frequency of the output; said D.-C. voltage being applied to the control circuit of said klystron tube means.

4. The invention according to claim 3, and indicator circuit means supplied with said sine-wave output for indicating the difference in frequency between the output of said mixer and of said standard source.

5. The invention according to claim 3, said klystron having a high-voltage D.-C. repeller circuit, said means for applying D.-C. voltage including an electronic-path voltage-controlled impedance element in series with said high-voltage repeller circuit, and circuit means for applying to said impedance element a control voltage which is a function of the amplitude and phase of said sine-wave output.

6. The invention according to claim 5, said last circuit means including a transformer having a center-tap secondary winding and a primary winding, means for supplying phase-reference voltage to said primary winding, means for supplying a signal derived from said sine-wave voltage to the center tap of the transformer secondary, an interconnection circuit connecting the secondary terminals of said transformer to said voltage-controlled impedance element, and rectifier means in said interconnection circuit to provide a unidirectional control voltage in said interconnection circuit which is determined by the phase and amplitude of said sine-wave output.

7. The invention according to claim 6, said interconnection circuit including a center-tap potentiometer connected across said circuit, said potentiometer having an adjustable center section, a circuit connecting said adjustable center section to the center tap of the transformer, and a voltage-dropping impedance in said last circuit.

8. The invention according to claim 7, and condenser means connected from the center-tap of said potentiometer to ground to provide a low-impedance A.-C. ground path.

References Cited in the file of this patent
UNITED STATES PATENTS

| | | |
|---|---|---|
| 2,424,833 | Korman | July 29, 1947 |
| 2,577,668 | Wilmott et. al. | Dec. 4, 1951 |
| 2,713,122 | Henley | July 12, 1955 |
| 2,849,613 | Dicke | Aug. 26, 1958 |

FOREIGN PATENTS

| | | |
|---|---|---|
| 210,788 | Australia | Oct. 23, 1957 |

OTHER REFERENCES

Hedrich et al.: "Calibration of Signal Generator Output Voltage in the Range of 100 to 1000 Megacycles," IRE Transactions on Instrumentation, December 1958; vols. 1–7, Nos. 3 and 4, pp. 275–279.